United States Patent
Thomas et al.

(10) Patent No.: US 7,639,492 B2
(45) Date of Patent: Dec. 29, 2009

(54) DRIVE CARRIER FOR COMPUTER SYSTEMS

(75) Inventors: Fred C. Thomas, Fort Collins, CO (US); Max Chen, San Francisco, CA (US); Arthur Sandoval, San Francisco, CA (US); Travis Lee, San Francisco, CA (US); Matthew Peterson, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 11/741,666

(22) Filed: Apr. 27, 2007

(65) Prior Publication Data

US 2008/0266779 A1  Oct. 30, 2008

(51) Int. Cl.
*H05K 5/00* (2006.01)
*H05K 7/00* (2006.01)

(52) U.S. Cl. .......................... 361/679.37; 361/679.38; 361/679.36; 361/679.33

(58) Field of Classification Search ............ 361/679.37, 361/679.38, 679.39, 679.33, 679.34, 679.36
See application file for complete search history.

(56) References Cited

U.S. PATENT DOCUMENTS

| | | | |
|---|---|---|---|
| 4,937,806 A | 6/1990 | Babson et al. | |
| 5,513,069 A * | 4/1996 | Ohgami et al. | 361/679.39 |
| 5,654,873 A * | 8/1997 | Smithson et al. | 361/679.37 |
| 5,682,291 A | 10/1997 | Jeffries et al. | |
| 5,767,445 A | 6/1998 | Wu | |
| 5,921,644 A * | 7/1999 | Brunel et al. | 312/223.2 |
| 6,366,457 B1 | 4/2002 | Otto et al. | |
| 6,836,406 B2 * | 12/2004 | Weng et al. | 361/679.38 |

\* cited by examiner

*Primary Examiner*—Jayprakash N Gandhi
*Assistant Examiner*—Anthony M Haughton

(57) ABSTRACT

A drive carrier for computer systems. At least some of the illustrative embodiments are drive carriers comprising a first suspension member that defines a first side of the drive carrier, a second suspension member that defines a second side of the drive carrier (the second suspension member configured to be manually flexed resiliently away from the drive carrier during installation of a disk drive), a handle having a hinge point coupled to the suspension members (the hinge point defining an axis of rotation for the handle, and the axis of rotation lies substantially parallel to a plane in which both suspension members reside), a first pin configured to couple to a mounting hole of the disk drive (and the first pin coupled to the first suspension member), and a second pin configured to couple to a mounting hole of the disk drive (and the second pin coupled to the second suspension member, wherein the first and second pins suspend the disk drive within the drive carrier between the suspension members).

21 Claims, 6 Drawing Sheets

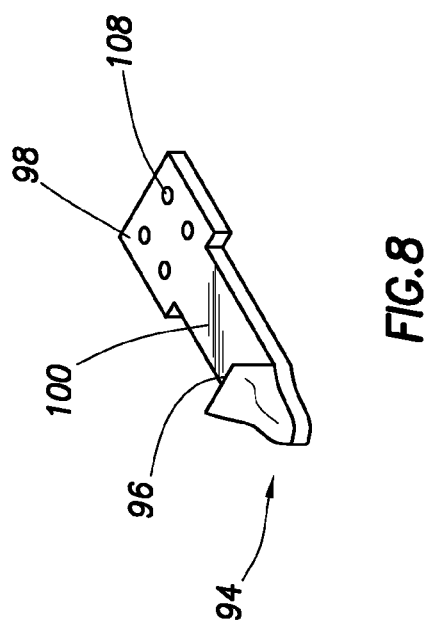
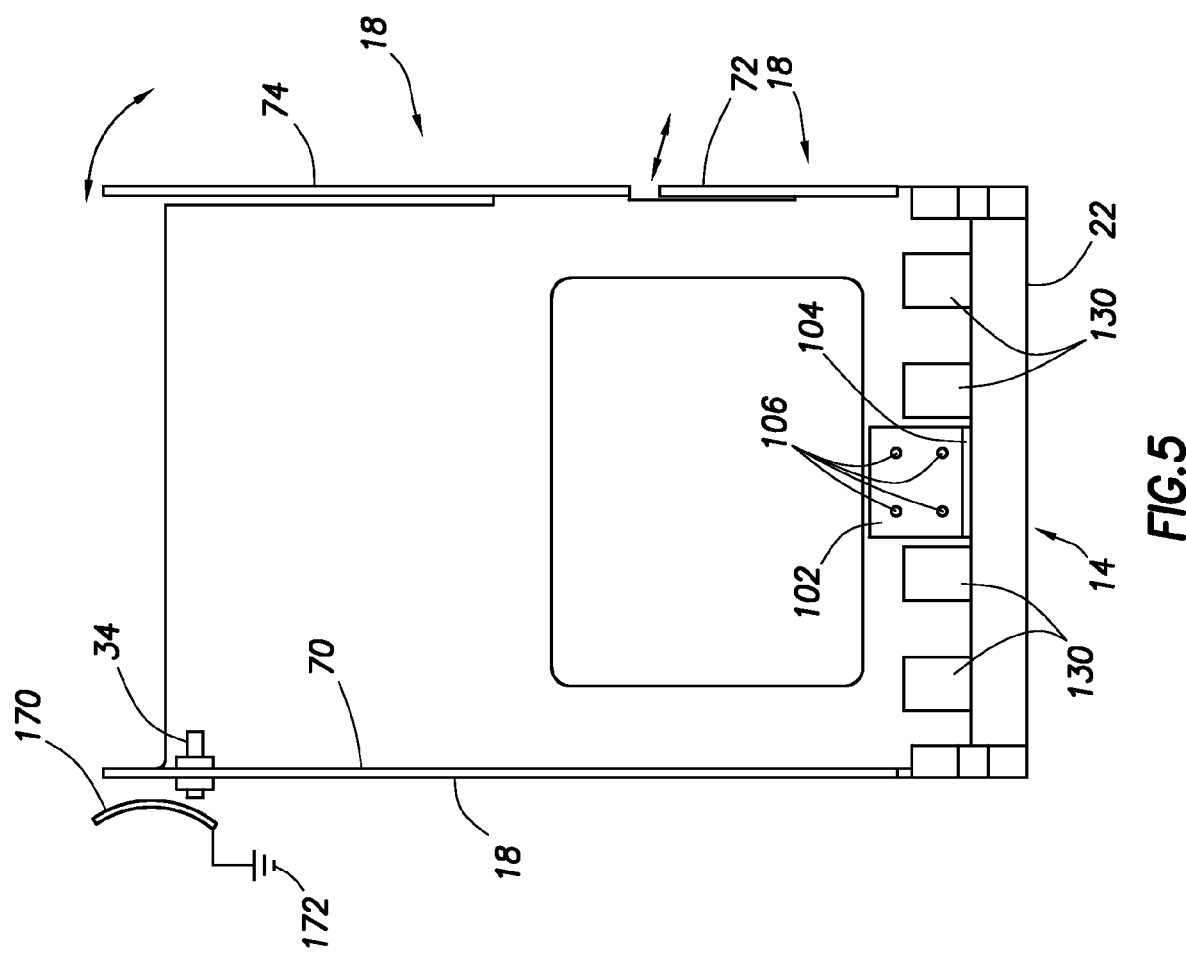

US 7,639,492 B2

DRIVE CARRIER FOR COMPUTER SYSTEMS

BACKGROUND

Drive carriers are devices to which storage devices (e.g., hard disk drives) are attached, and the combination drive carrier and storage device may be selectively removed and inserted into a computer system (e.g., hot pluggable hard drives in server systems). Many features are desirable in drive carriers; however, additional features drive the cost and complexity of related-art drive carriers beyond that which is economically feasible for commercial production. In particular, feature rich drive carriers may be prohibitively expensive for consumers, and/or prohibitively difficult to assemble.

BRIEF DESCRIPTION OF THE DRAWINGS

For a detailed description of various embodiments, reference will now be made to the accompanying drawings in which:

FIG. 5 shows an overhead view of a drive carrier in accordance with alternative embodiments;

FIG. 8 shows a perspective view of a latch member in accordance with various embodiments;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or connection. Thus, if a first device couples to a second device, that connection may be through a direct connection or through an indirect connection via other devices and connections. Moreover, the term "system" means "one or more components" combined together. Thus, a system can comprise an "entire system" or "subsystems" within an overall system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
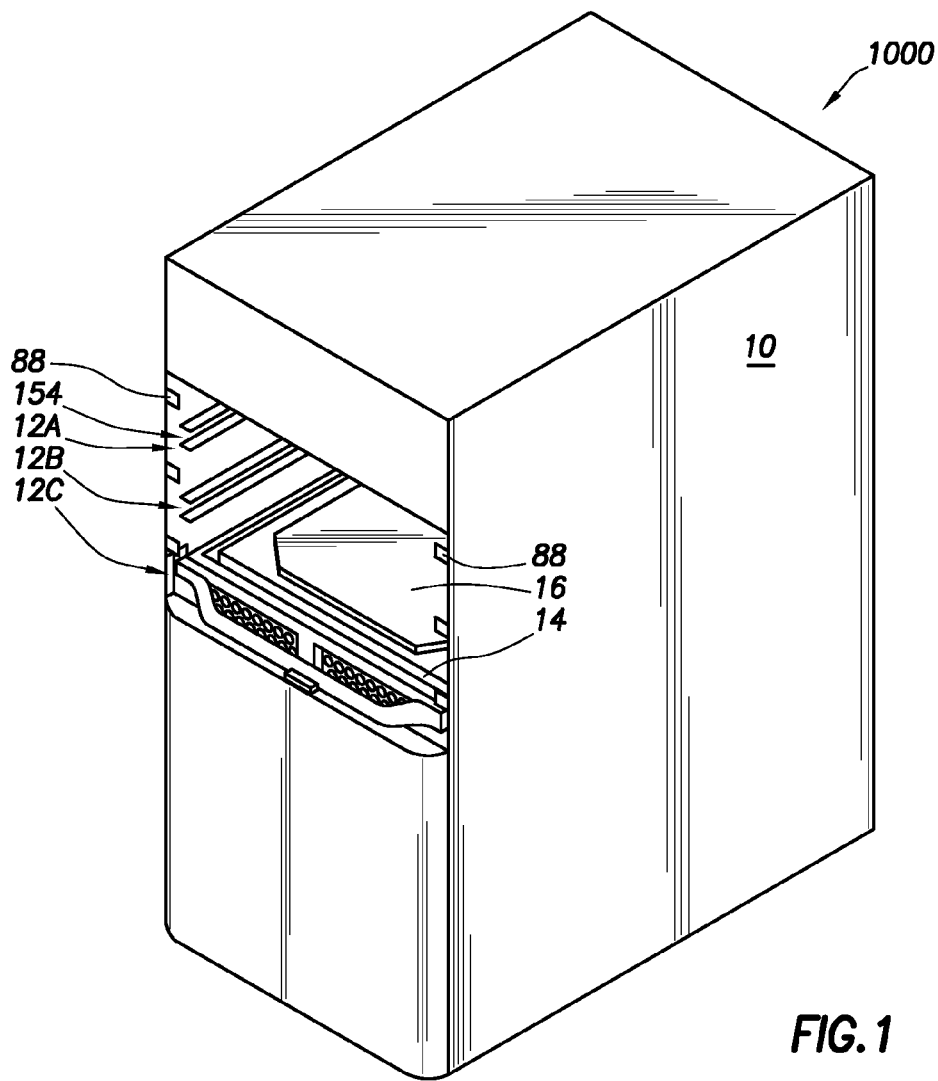
FIG. 1 shows a computer system in accordance with various embodiments.

FIG. 1 shows a computer system 1000 in accordance with at least some embodiments. The computer system 1000 may be, for example, a home computer system, a server, a network attached storage device, a video gaming console and/or a television programming decoder and recorder. In particular, the computer system 1000 comprises an enclosure 10 (which is at least partially metallic) within which the various electrical components reside. In accordance with the various embodiments, the computer system 1000 also comprises at least one drive bay 12, and as illustrated three such drive bays (12A, 12B and 12C), but any number of drive bays may be equivalently used. Each drive bay 12 is a receptacle for a drive carrier 14 and attached disk drive 16 (e.g., a hard disk drive). In accordance with some embodiments, the disk drive 16 is a serial ATA (SATA) drive, and thus is specifically designed for hot-plugging of the disk drive 16 into and out of the computer system 1000 by way of the drive bays 12; however, the drive carrier 14 of the various embodiments may be used with other storage communication protocols, including storage communication protocols that do not enable hot-plugging.

Figure 2:
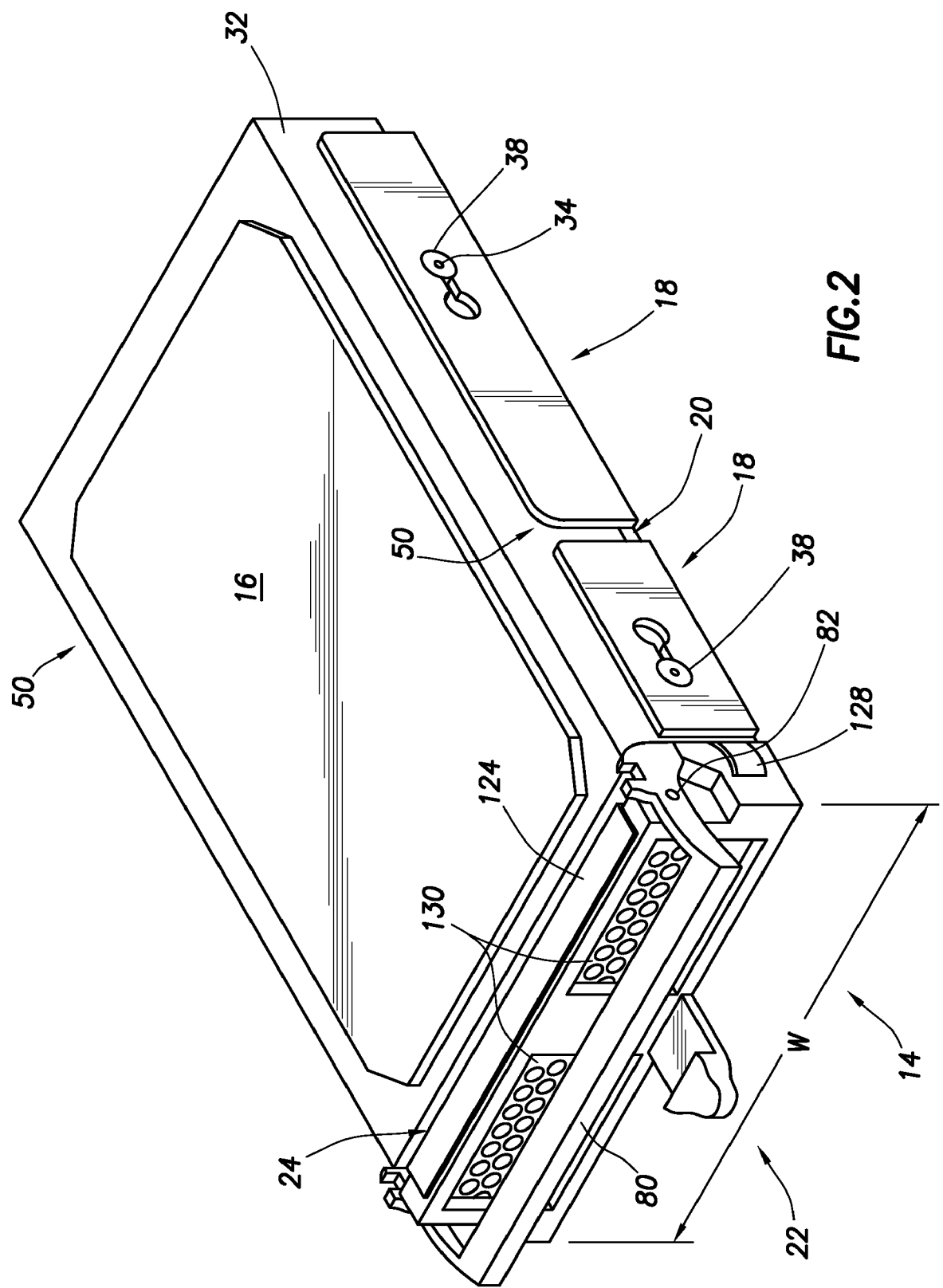
FIG. 2 shows a perspective view of a drive carrier and attached disk drive in accordance with various embodiments.

FIG. 2 is a perspective view of the drive carrier 14 and attached disk drive 16. In particular, the drive carrier 14 comprises a plurality of rails or suspension members 18. The suspension members hold and suspend the disk drive 16 within the driver carrier 14 and also act to guide the drive carrier 14 into and out of the drive bay 12. In order to isolate the disk drive 16 from the components of the drive carrier 14 such that vibration of the disk drive (particularly vibration which results in audible sound) is not conducted to other components, the rails or suspension members 18 suspend the disk drive 16 above the bottom of the drive carrier (e.g., on the order of a few millimeters, as illustrated by gap 20). The suspension members 18 may likewise hold the disk drive away from physical contact with components of the drive carrier 14 near the front face 22. For example, the suspension members 18 may hold the disk drive 16 away from the front face 22 at a distance on the order of a few millimeters, as illustrated by gap 24.

Figure 3:
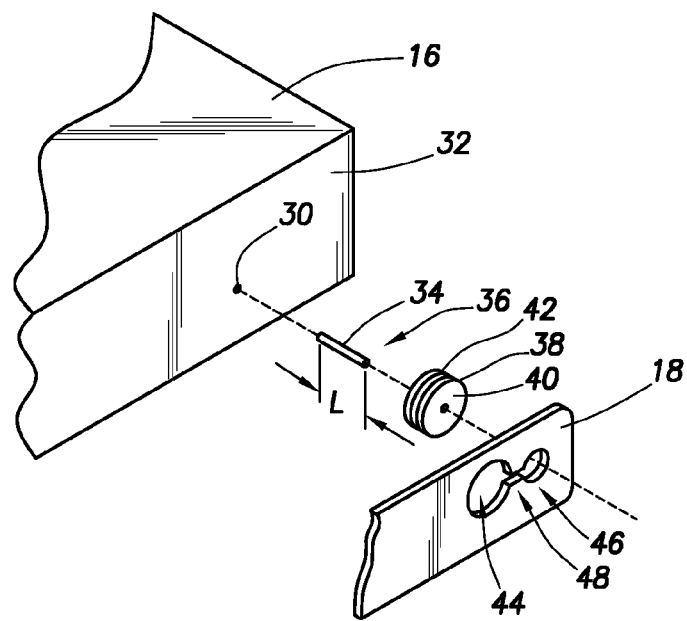
FIG. 3 shows a perspective cut-away and exploded view of coupling the disk drive to a suspension member in accordance with various embodiments.

In accordance with at least some embodiments, the disk drive 16 is held within the drive carrier by way of a plurality of threaded mounting holes on the disk drive 16 itself. In particular, FIG. 3 illustrates, in perspective view, a portion of a disk drive 16, including a threaded mounting hole 30. In accordance with the various embodiments, disk drives have a plurality (in some cases four) threaded mounting holes on their side faces (e.g., two threaded holes on face 32 (only one hole 30 shown in FIG. 3 for simplicity), and two threaded holes on the opposite face). The threaded mounting holes 30 can be at any suitable location, and the locations may be in conformance with standards promulgated by disk drive manufacturers. In some embodiments, a pin 34 is inserted into each threaded mounting hole 30. The pin 34 may be, for example, a metallic pin having a smooth exterior surface and having outside diameter is slightly smaller than the inside diameter of the hole 30. Pin 34 has a sufficient length L that when fully inserted, a distal portion 36 of the pin 34 protrudes from the face 32 (e.g., protruding on the order of a centimeter). An isolation member 38 (e.g., a rubber grommet) telescopes over the protruding distal portion 36, and in some embodiments the pin 34 is exposed on the outer surface 40 of the isolation member 38. The isolation member 38, in turn, is held in place by a suspension member 18. Although FIG. 3 shows the pin 34 and isolation member 38 as separate components that may be selectively coupled and de-coupled, in other embodiments the pin 34 and isolation member 38 are an integrated component (e.g., the pin 34 is press fit into the isolation member 38, or the pin 34 is attached within the isolation member 38 by an adhesive). In yet further alternative embodiments, the pin 34 may be threaded to mate with threads of threaded hole 30, and thus rather than telescoping into the threaded mounting hole 30, the pin 34 may screw into threaded mounting hole 30; however, threadingly coupling the pin 35 to the threaded mounting hole 30 may dictate use of hand tools—whereas, telescoping pin 34 into the threaded mounting hole 30 may be accomplished without tools.

Still referring to FIG. 3, in some embodiments, coupling the isolation member 38 to the suspension member 18 comprises inserting isolation member 38 into an aperture 44 such that there is a friction fit between the isolation member 38 and aperture 44. In embodiments where isolation member 38 couples by friction fit to the suspension member 18, an inside diameter of the aperture 44 is approximately the same (or slightly smaller) than the outside diameter of the isolation member 38. In other embodiments, the isolation member 38 has a circumferential groove 42, with the circumferential groove defining a reduced diameter portion of the isolation member 38. In these embodiments, the suspension member 18 comprises a reduced diameter aperture 46, and groove 48 connecting the aperture 44 to the aperture 46. The width of the groove 48 is selected to be substantially the same as the diameter of the reduced diameter portion of the isolation member 38, and the inside diameter of the aperture 46 is selected to be slightly larger than the reduced diameter portion of the isolation member 38, yet smaller than the outside diameter of the isolation member 38. Isolation member 38 is inserted into aperture 44 until the circumferential groove 42 aligns with the groove 48, and the isolation member is then slid from aperture 44 to aperture 46. In cases where width of the grove 48 is slightly smaller than the diameter of the reduced diameter portion of the isolation member, the isolation member 38 deforms slightly when sliding along the groove 48 (e.g., if the isolation member 38 is made of rubber or other pliable material).

In accordance with embodiments where the disk drive 16 has four threaded mounting holes, each threaded mounting hole is provided a pin 34 and isolation member 38. Returning to FIG. 2, only two isolation members 38 are visible, but threading mounting holes on face 50, likewise have pins and isolation members coupled to suspension members on that side of the drive carrier. In accordance with at least some embodiments, only a relatively small gap exists between the disk drive 16 and the suspension members 18 (e.g., on the order of a few millimeters). When each pin 34 and isolation member 38 are an integrated component, there may be insufficient room to insert the pin/isolation member into the threaded mounting holes and likewise into the apertures of the suspension members. In order to address difficulties such as these, and in accordance with at least some embodiments, the suspension members 18 flex to enable insertion of the pins 34 and isolation members 38.

Figure 4:
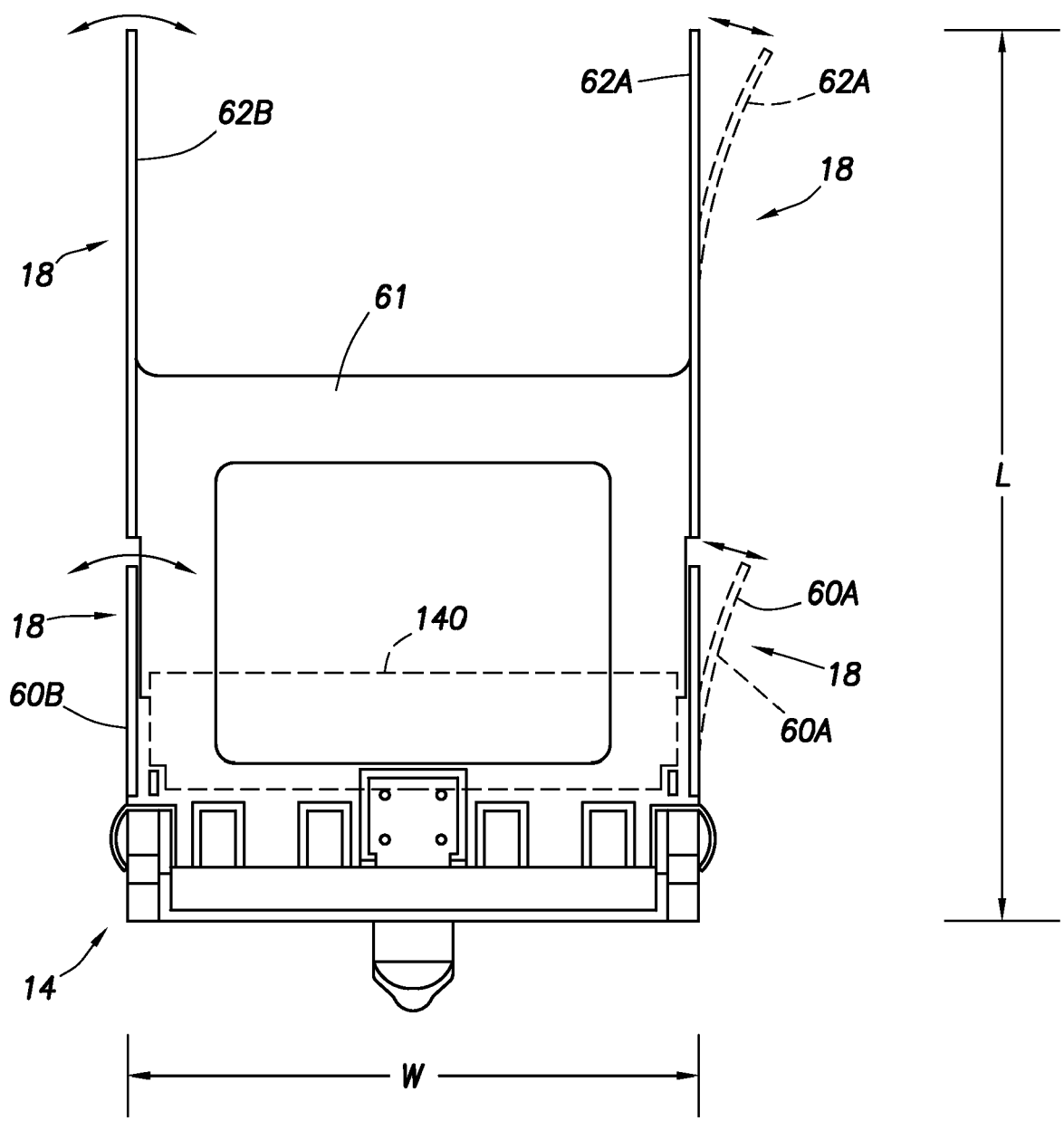
FIG. 4 shows an overhead view of a drive carrier in accordance with various embodiments.

FIG. 4 shows an overhead view of the drive carrier 14 in accordance with some embodiments, the view of FIG. 4 with the disk drive 16 removed. In particular, in the embodiments illustrated in FIG. 4, the suspension members 18 couple to a structural member 61. The suspension members further comprise proximal suspension members 60A and 60B (one on each side) and distal suspension members 62A and 62B (also one on each side). In accordance with at least some embodiments, each of the suspension members 18 are resilient and can be manually flexed or pulled away from the drive carrier 14, as illustrated by dashed-line versions of the proximal suspension member 60A and the distal suspension member 62A. In accordance with these embodiments, the suspension members 18 may be made of resilient plastic, or may be metallic but of a thickness to be resilient as illustrated. As between the pulled or flexed orientation (dashed versions) and the rest orientations (solid versions), each suspension member defines an arc, with the arc being substantially parallel to a plane defined by the suspension members 18 (in FIG. 4, the plane of the page).

Referring simultaneously to FIGS. 2 and 4, insertion of the pin 34 and isolation member 38 into each threaded mounting hole 30 of the disk drive 16 may thus involve placing the disk drive 16 within an area defined by the drive carrier 14. Thereafter, each suspension member 18 is pulled or flexed away from the driver carrier 14 (and likewise, away from the disk drive 16). The pin 34 and isolation member 38 may be inserted into the space between the suspension member 18 and the disk drive 16 created by flexing of the suspension member 18. In embodiments where the isolation member 38 couples to the suspension members 18 by way of dual aperture and groove arrangement (as shown in FIGS. 2 and 3 (apertures 44 and 46 and groove 48)), first the isolation member 38 is coupled to the suspension member 18, then the suspension member 18 is enabled to return to a rest orientation. As the suspension member 18 returns to its rest orientation, the pin 34 telescopically couples with a threaded mounting hole 30. In embodiments where the isolation member 38 couples to the suspension member by way of a friction fit, the pin 34 may be first telescoped into the threaded mounting hole of the disk drive 16, and then the isolation member 38 inserted into a corresponding aperture of the suspension member 18. Coupling of the pin 34 to the disk drive, and isolation member 38 a suspension member 18, is completed for each threaded mounting hole 30 of the disk drive. When complete, the disk drive is held in place within the drive carrier, and because the disk drive only couples to the drive carrier 14 by way of the pins 34 and isolation members 38, the disk drive 16 is vibrationally isolated from the drive carrier 14 (and computer system 1000). Moreover, mounting of the disk drive 16 into the driver carrier 14 as described above is accomplished without the use of tools (tool-less insertion of the disk drive into the drive carrier 14).

In the embodiments discussed with respect to FIG. 4, the drive carrier 14 comprises four suspension members 18, and each suspension member flexes to enable tool-less coupling of the disk drive 16 to the drive carrier 14. In alternative embodiments, however, some of the suspension members may be relatively inflexible. FIG. 5 illustrates alternative embodiments where suspension members 18 comprise a rigid suspension member 70, a proximal suspension member 72 that is flexible, and a distal suspension member 74 that is also flexible. Coupling a disk drive 16 to the drive carrier 14 in these embodiments may thus involve coupling the one or more threaded mounting holes of one face of the disk drive to the rigid suspension member 70 (e.g., by way of a pin 34 and isolation member 38), and then coupling a second face of the disk drive 16 to the suspension members 72 and 74. With respect to coupling to suspension members 72 and 74, each suspension member may be flexed away from the disk drive 16 to allow sufficient space for insertion of the pin 34 and isolation member 38. As the flexible members are enabled to return to their resting or non-flexed position, the pins 34 may thus telescope within the threaded mounting holes.

Figure 6:
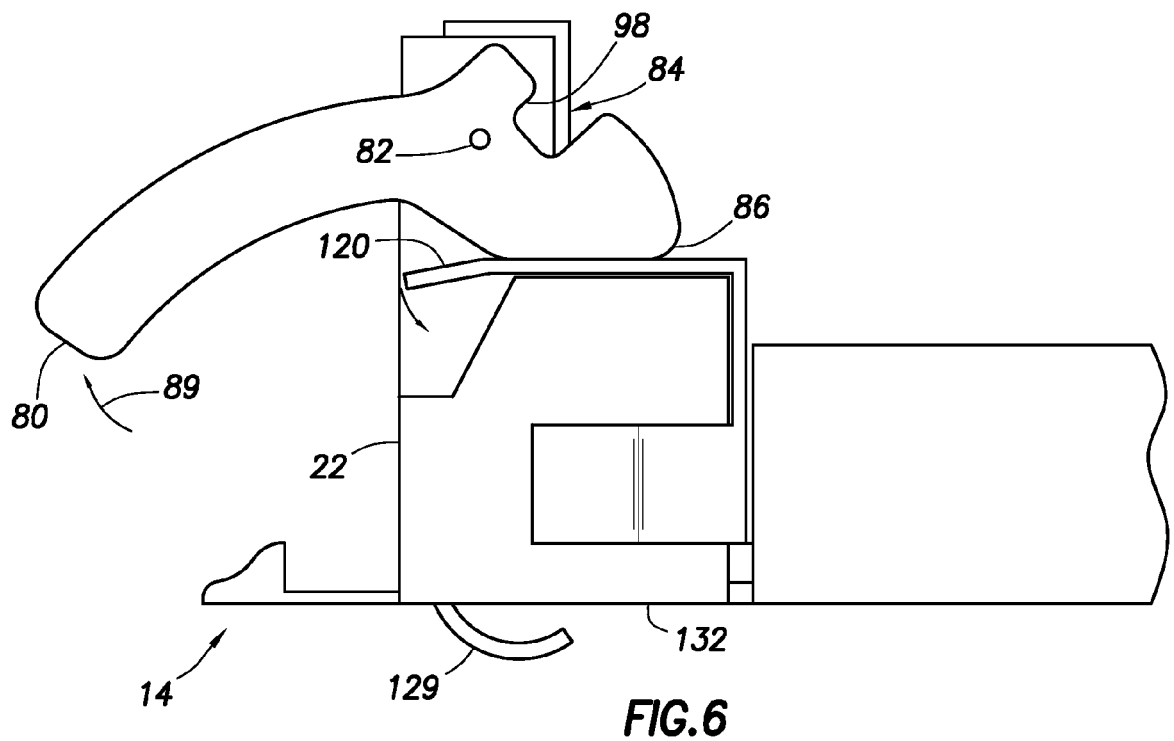
FIG. 6 shows a partial side elevational view the drive carrier in accordance with various embodiments, with the handle in an un-latched orientation.

Returning to FIG. 2, the drive carrier 14, in accordance with some embodiments, also comprises a handle 80 that in some embodiments spans substantially the entire width W of the drive carrier 14. Moreover, the handle 80 comprises two hinge members 82 (only one of which is visible in FIG. 2), and the axis of rotation of the handle 80 is substantially along the width of the drive carrier 14. Using handle 18, the drive carrier 14 may be inserted into, and removed from, the computer system 10 (FIG. 1). FIG. 6 shows a partial elevational side view of drive carrier 14, with focus on the handle 80. In particular, FIG. 6 shows the handle 80 in an unlatched orientation, which unlatched orientation is used when physically pulling the driver carrier 14 out of the computer system 10, or physically pushing the drive carrier 14 into the computer system 10. The handle 80 comprises hinge 82, a catch portion 84 and rotational stop portion 86. With respect to the rotational stop portion 86, as the handle is rotated upward as indicated by arrow 89, rotation of the handle 80 beyond a particular point is precluded by the stop portion 86 contacting another structures of the drive carrier 14. With respect to catch portion 84, the catch portion 84 works in concert with physical structures of the drive bay 12 (FIG. 1), to complete the electrical/optical coupling of the disk drive 16 to the computer system 10, and also acts to hold the drive in a latched configuration.

Figure 7:
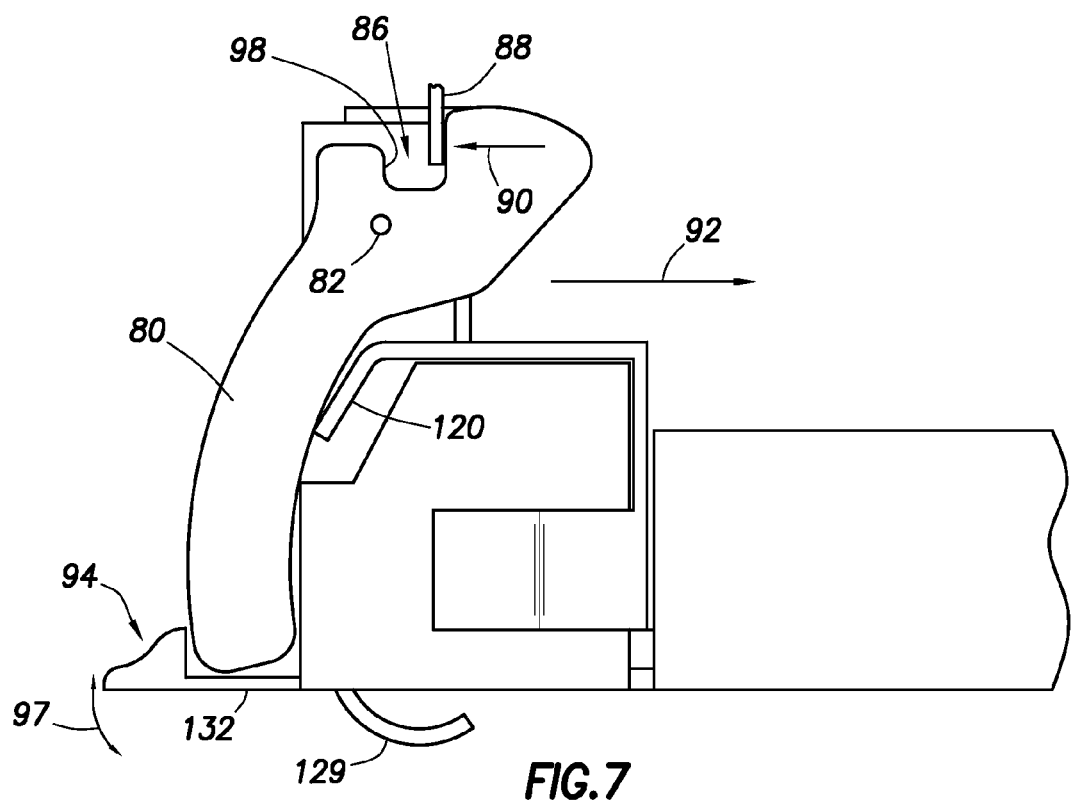
FIG. 7 shows a partial side elevational view the drive carrier in accordance with various embodiments, with the handle in a latched orientation.

FIG. 7 shows a partial elevational side view of drive carrier 14, with focus on the handle 80 in the latched configuration. In particular, FIG. 7 shows handle 80 in a latched configuration, with the catch portion 84 in operational relationship to tab 88. Tab 88 is also shown in FIG. 1 with respect to drive bay 12A. In the latched configuration, the catch portion 84 contacts tab 88. Because of force applied to tab 88 by the handle 80 (i.e., an insertion force, with the insertion force illustrated by line 90), the drive carrier is forced into the drive bay (this force illustrated by line 92). In some embodiments, handle 80 is held in the latched configuration by latch member 94. When a user desires to release the handle 80 and remove the drive carrier 14, the latch member 94 is flexed downward, as illustrated by line 97, thus allowing the handle 80 to rotate about an axis comprising hinge 82. In removal operations, the catch portion 84 may also assist by contacting the tab 88 by way of portion 98, and transferring force applied to the handle 80 to the tab 88 (i.e., a removal force).

The latch member 94 may take many forms. In some embodiments, the latch member is integrally formed with the drive carrier 14 front face 22. In other embodiments, the latch member 94 is a separate component assembled with the drive carrier 14. FIG. 8 illustrates embodiments where the latch member 94 is a separate component. In particular, the latch member 94 comprises a catch portion 96 coupled to a connecting portion 98 by way of a flexible member 100. In some embodiments, the latch member 94 is made of resilient plastic, and in other embodiments some or all of the latch member 94, particularly the flexible member 100, is made of flexible metallic material. With regard to coupling of the latch member 94 to the drive carrier, FIG. 4 illustrates connection area 102 which is configured to receive the connection portion 98 of the latch member 94. In particular, the connection portion 98 of the latch member 94 is inserted through rectangular aperture 104, and then mated to the connection area 102, such as press fit of pins 106 into apertures 108, by use of an adhesive, or both. Once the connection portion 98 is coupled to the connection area 102, the latch member 94 extends outward from the face 22, as shown in the figures (particularly FIGS. 2, 4 and 6-7).

In some embodiments, the handle 80 torsions a spring member in the latched orientation. In particular, in the latched orientation shown in FIG. 7, the handle 80 in the latched orientation torsions spring member 120 (in FIG. 7, the spring member 120 is show in its torsioned position). When the latch member 94 is flexed downward, thus allowing the handle 80 the ability to rotate upward about an axis defined by the hinge 82, the torsion spring member 120 provides for movement of the handle 80, possibly to assist the user in grasping the handle, and also to provide visual feedback to the user of the release of the handle 80 from the latched position. FIG. 6 shows the spring member 120 in its relaxed orientation.

Figure 9:
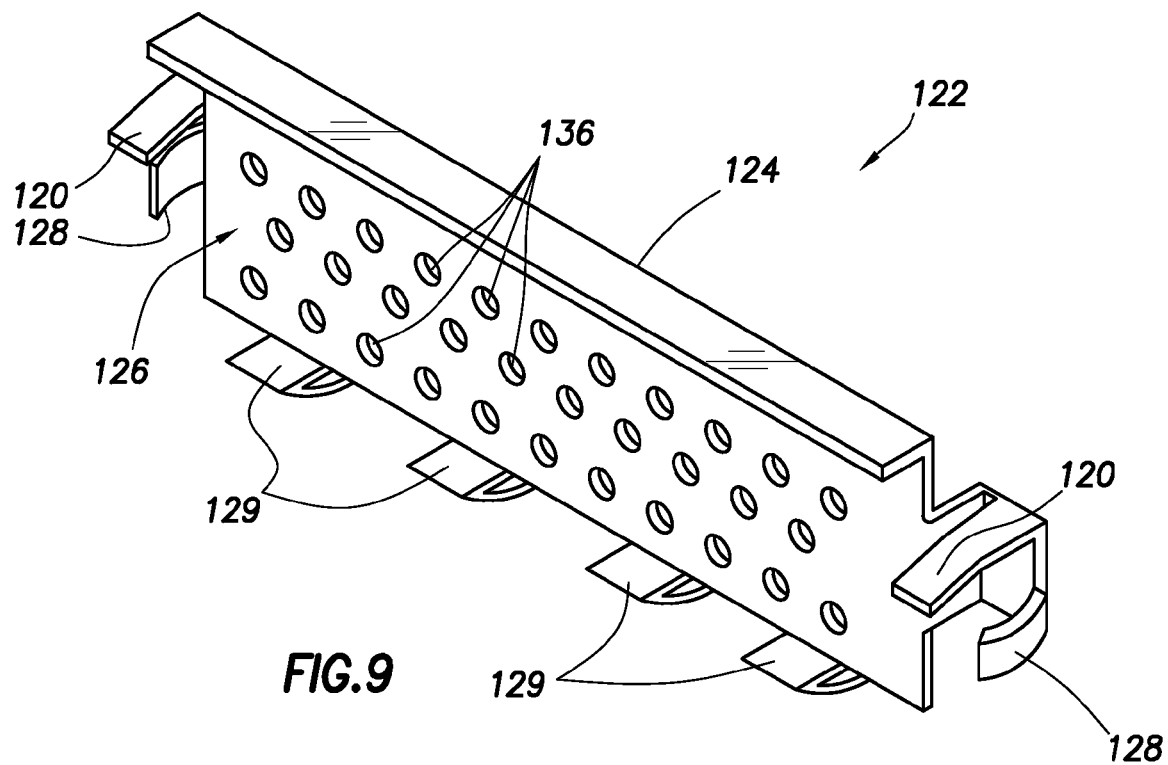
FIG. 9 shows a perspective view of a metallic member in accordance with various embodiments.

In accordance with at least some embodiments, spring member 120 is a portion of a larger assembly that serves a plurality of functions in the drive carrier 14. FIG. 9 shows metallic member 122 in accordance with at least some embodiments. In particular, metallic member 122 comprises spring members 120, lip portion 124, electromagnetic interference (EMI) shield portion 126 as well as a plurality of grounding fingers 128, and grounding fingers 129. As discussed above, the spring portions 120 assist with operation of the handle 80. The EMI shield portion 126 is configured to partially occlude apertures 130 (FIG. 1) of the drive carrier 14, to reduce propagation of electromagnetic interference through the apertures 130. In order for the EMI portion 126 to reduce electromagnetic interference, the metallic member 122 should be grounded to at least a portion of the enclosure 10 (FIG. 1). Such grounding is accomplished, at least in part, by way of grounding fingers 128. Returning briefly to FIG. 2, grounding fingers 128 are disposed on a side of the drive carrier 14. As the drive carrier is inserted into a drive bay 12 (FIG. 1), the grounding fingers electrically couple to the enclosure 10. Thus, each metallic member 122 of at least one drive carrier 14 is electrically coupled to the enclosure 10, thus forming an EMI shield with respect to EMI that would otherwise propagate out the apertures 130.

Referring again to FIG. 9, while the EMI shield portion 126 blocks EMI from escaping through apertures 130 (FIG. 2), when several drive carriers 14 are stacked within a computer system 1000, electromagnetic interference may propagate out of the computer system through gaps between successive drive carriers. In order to address electromagnetic interference propagating out of the computer system through gaps between successive drive carriers, metallic member 122 further comprises the lip portion 124 and the grounding fingers 129. As shown in FIG. 2, the lip portion 124 of the metallic member 122 is electrically exposed on an upper surface of the drive carrier 14. The lip portion 124 is configured to electrically contact grounding fingers 129 of the metallic member 122 of a drive carrier 14 immediately above (if present). Likewise, the grounding fingers 129 are configured to extend below the drive carrier 14 (e.g., below the lower surface 132 as shown in FIGS. 6 and 7). The grounding fingers may extend below the drive carrier 14 by protruding through apertures in the drive carrier 14. The apertures 130 are best seen in the overheard view of the drive carrier 14 of FIG. 5 (drive carrier 14 shown with the metallic member 122 not present), but the apertures are also visible, though not numbered, in FIG. 4 (metallic member 122 present), and the perspective view of FIG. 8 (discussed more below with reference to airflow). As illustrated, the metallic member 122, with all its constituent portions and members, can, in some embodiments, be fabricated from a single piece of metal, cut to a particular shape, then bent and formed.

In the discussion above, it is noted that the suspension members 18 hold the disk drive 16 above the bottom of the drive carrier 14 (see gap 20 of FIG. 1), and also hold the disk drive from contact with the member of the drive carrier forming the front face 22 (see gap 24 of FIG. 1). In addition to providing vibration isolation, holding the disk drive 16 in the discussed orientations also provides space for ventilation of the disk drive 16. In particular, in some embodiments computer system 1000 is configured to move air across the disk drive 16, such as back-to-front. For at least this reason the drive carrier 14 is provided with apertures 130 in the front face 22, and likewise the EMI shield portion of the metallic member 122 has a plurality of holes 136 (see, e.g., FIG. 9 where the holes are numbered, but such holes also visible in FIGS. 1 and 2). Thus, in some embodiments the computer system 10 forces cool air across the disk drive 16 (both on top as well as in the gap 20 between the disk drive 16 and the drive carrier 14), and then out the apertures 130 though the holes in the EMI shield portion of the metallic member 122.

Figure 10:
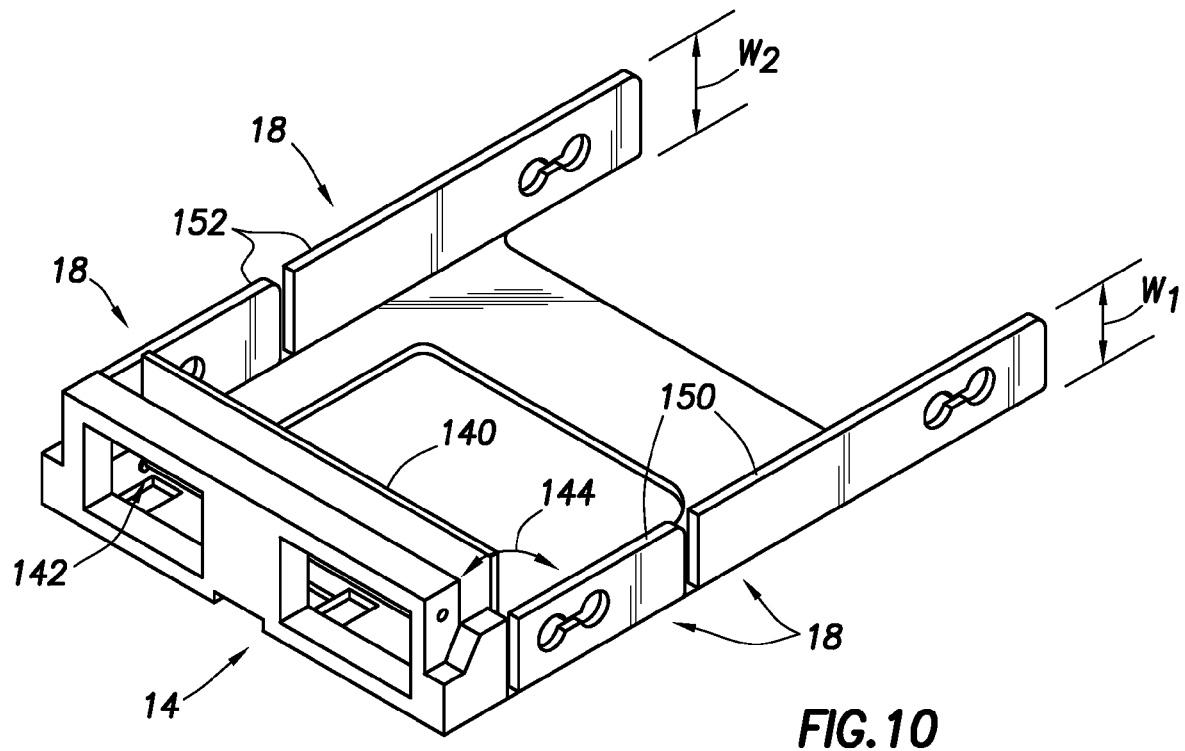
FIG. 10 shows a perspective view of a drive carrier with an airflow baffle in accordance with various embodiments.

However, there may be situations where a computer system 1000 has more drive bays 12 and drive carriers 14 than disk drives 16, in which case one or more drive carriers 14 may be inserted into the drive bays 12 without disk drives. Air, like electricity, attempts to take the path of least resistance when moving, and a drive carrier 14 with no attached disk drive 16 presents a flow path with significantly less resistance to airflow than a drive carrier 14 with a disk drive 16. In such situations, airflow tends to bypass the drive carriers 14 with disk drives 16, and instead escapes the computer system 1000 through the one or more drive carriers 14 without disk drives 16. For at least this reason, at least some embodiments of the drive carrier 14 implement an airflow baffle. In particular, FIG. 10 illustrates a perspective view of drive carrier 14 in accordance with alternative embodiments. The drive carrier 14 of FIG. 10 is shown without the metallic member 122 and without the handle 80 so as not to unduly complicate the figure. The drive carrier 14 of FIG. 10 comprises airflow baffle 140, which hingedly couples to the drive carrier 14, such as by way of hinge 142. When the drive carrier 14 has an installed disk drive 16, the airflow baffle is rotated (as illustrated by arrow 144) to lay substantially flat on the inside of the drive carrier 14. Referring briefly to FIG. 4, FIG. 4 shows airflow baffle 140 in dashed lines, with the airflow baffle 140 flat on the inside of the drive carrier 14 (orientation when a disk drive 16 is installed in the drive carrier). However, if the drive carrier is not installed, the airflow baffle 140 is raised so as to impede airflow. The airflow baffle of FIG. 10 is shown raised and thus configured to impede airflow along the length of the drive carrier 14. In other embodiments the airflow baffle 140 may be arranged to impede airflow along the width of the drive carrier 14 for computer systems where the airflow paths are so configured. It will be appreciated that baffle 140 may be other shapes, as desired.

FIG. 10 also illustrates embodiments of the drive carrier 14 that ensure that the drive carrier 14 can only be inserted into the drive bay 12 in one orientation (i.e., cannot be installed upside-down). In particular, in accordance with at least some embodiments, the suspension members 18 on a first side of the drive carrier 14 have a width different than the width of the suspension members 18 on a second side of the drive carrier. In the illustration of FIG. 10, suspension members 150 have a width ("W1" in the figure), and suspension members 152 have a width ("W2" in the figure), where the width W2 is greater than the width W1. Insertion of the drive carrier 14 into the drive bay 12 involves placing the suspension members 18 into mating channels of the enclosure 10 (e.g., channel 154 of FIG. 1 in drive bay 12A). Thus, not only do the suspension members suspend the disk drive 16 within the drive carrier 14, but the suspension members 18 also work in combination with the channels 154 to act as guide rails for insertion and removal of the drive carrier 14. In accordance with at least some embodiments, the channel 154 width on one side of the drive bay is different than the channel width on a second side of the drive bay 12, and in combination with a drive carrier 14 whose suspension members 18 have different widths W1 and W2, the drive carrier 14 and enclosure 10 ensure that the drive carrier 14 cannot be installed in the computer system 1000 in an incorrect orientation. Stated otherwise, in these embodiments the widths of the channels 154 of the enclosure 10 are selected to be slightly larger than the width of the suspension members 18 inserted into the channels when properly oriented. Because in these embodiments the width of suspension members 150 are smaller than the width of suspension members 152, if a user attempts to insert a drive carrier 14 into a drive bay upside-down, while the smaller suspension members 150 may have the capability of sliding within the channel configured for the wider suspension members 152, the suspension members 152 will not slide within the channel configured for the smaller width suspension members 150, thus preventing incorrect insertion of the drive carrier 14.

Another consideration in the design of a drive carrier 14 is static electricity, and more particularly discharge of static electricity. During installation of the disk drive 16 in the drive carrier 14, and/or handling of the disk drive 16 alone or while installed in the drive carrier 14, static electricity may accumulate on the disk drive. To ensure that the static electricity does not discharge in a manner detrimental to electrical circuits in the disk drive 16 or the computer system 1000, in accordance with various embodiments, static electricity on the disk drive 16 is discharged as the drive carrier 14 and attached disk drive 16 are inserted into a drive bay 12. In accordance with some embodiments, static electricity accumulated on the disk drive 16 is discharged through one or more of the pins 34 which couple to the disk drive through the threaded mounting holes 30.

As discussed with respect to FIG. 3, in some embodiments, the pin 34 is metallic and the pin 34 is exposed on the outer surface 40 of the isolation member 38. The exposure of the pin 34 could be by way of forming a substantially planer surface 40 in spite of the aperture through which the pin 34 extends, or the exposure could be by way of the pin 34 extending beyond or protruding from the surface 40. In accordance with at least some embodiments, as the drive carrier 14 is inserted into the drive bay 12, at least one pin 34 suspending the disk drive 16 in the drive carrier 14 is electrically coupled to ground, at least momentarily, but in some embodiments for the entire time the drive carrier 14 is within the drive bay 12. FIG. 5 illustrates embodiments of coupling the pin 34 to ground when the drive carrier 14 is installed, or being installed, in the drive bay 12. In particular, a grounding finger 170 is in operational relationship to the pin 34. For example, the grounding finger 170 may reside within the channel 154 (FIG. 1) proximate to the opening of the drive bay 12, proximate to the back of the drive bay 12, or the grounding finger 170 may extend a substantial length of the channel 154. In situations where the grounding finger 170 is proximate to the front of the drive bay, all the pins 34 on that the corresponding side of the drive carrier 14 may contact the ground finger 170 during insertion of the drive carrier 14. As one or more of the pins 34 contact the grounding finger 170, static electricity on the disk drive is conducted to the ground 172 (which ground may be through the enclosure 10 in some embodiments).

The above discussion is meant to be illustrative of the principles and various embodiments of the present invention. Numerous variations and modifications will become apparent to those skilled in the art once the above disclosure is fully appreciated. For example, disk drive manufacturers may provide non-threaded mounting holes 30, and the various "toolless" embodiments of mounting the disk drives remain unchanged. Moreover, any physical size of magnetic or optical disk drive may be installed in the drive carrier 14 so long as that disk has mounting holes that align with apertures in the suspension members 18. Further still, the suspension members 18 may have a plurality of different apertures to accommodate different form factor disk drives, or disk drives from varying manufactures or varying promulgated standards. It is intended that the following claims be interpreted to embrace all such variations and modifications.

What is claimed is:

1. A drive carrier comprising:
   a first suspension member that defines a first plane on a first side of the drive carrier;
   a structural member coupled to the first suspension member, the structural member defines a second plane perpendicular to the first plane;
   a second suspension member coupled to the structural member, the second suspension member configured to be manually flexed resiliently away from the drive carrier during installation of a disk drive, and the second suspension member configured such that:
      in a rest position the second suspension member defines a third plane on a second side of the drive carrier, the third plane parallel to the first plane and perpendicular to the second plane, and in a flexed position of the second suspension member the second plane is still perpendicular to the first plane;
   a handle having a hinge point coupled to the suspension members, the hinge point defining an axis of rotation for the handle, and the axis of rotation lies substantially parallel to the second plane;
   a first pin configured to couple to a mounting hole of the disk drive, and the first pin coupled to the first suspension member; and
   a second pin configured to couple to a mounting hole of the disk drive, and the second pin coupled to the second suspension member, wherein the first and second pins suspend the disk drive within the drive carrier between the suspension members.

2. The drive carrier according to claim 1 further comprising:
   a catch portion on the handle;
   wherein when the drive carrier is inserted into a drive bay of a computer system, as the handle is rotated toward a latched configuration the catch portion applies an insertion force to the drive carrier.

3. The drive carrier according to claim 1 wherein the second pin further comprises a cylinder that defines a first portion and a second portion, the first portion telescopes into the mounting hole of the disk drive, and the first portion has a smooth outer surface.

4. The drive carrier according to claim 1 further comprising an isolation member that couples between the pin and the suspension member.

5. The drive carrier according to claim 4 wherein the isolation member is a rubber grommet.

6. The drive carrier according to claim 1 further comprising the first suspension member having a width;
   the second suspension member having a width greater than the first suspension member.

7. The drive carrier according to claim 1 further comprising:
   a third suspension member coupled to the structural member, the second suspension member configured to be manually flexed resiliently away from the drive carrier during installation of a disk drive, and the third suspension member configured such that:
      in a rest position the second suspension member defines a fourth plane on the second side of the drive carrier, the fourth plane parallel to the first and third planes and perpendicular to the second plane, and in a flexed position of the third suspension member the second plane is still perpendicular to the first plane;
   a third pin configured to couple to a mounting hole of the disk drive, and the third pin coupled to the third suspension member, wherein the first, second and third pins suspend the disk drive within the drive carrier between the suspension members.

8. A drive carrier comprising:
   a first suspension member that defines a first side of the drive carrier;
   a second suspension member that defines a second side of the drive carrier, the second suspension member configured to be manually flexed resiliently away from the drive carrier during installation of a disk drive;
   a handle having a hinge point coupled to the suspension members, the hinge point defining an axis of rotation for the handle, and the axis of rotation lies substantially perpendicular to a plane defined by the first suspension member;
   a first pin configured to couple to a mounting hole of the disk drive, and the first pin coupled to the first suspension member;
   a second pin configured to couple to a mounting hole of the disk drive, and the second pin coupled to the second suspension member, wherein the first and second pins suspend the disk drive within the drive carrier between the suspension members; and
   a catch portion on the handle;
   the catch portion is configured such that when the drive carrier is within a drive bay of a computer system, as the handle is rotated toward an unlatched configuration the catch portion applies a removal force to the drive carrier.

9. A drive carrier comprising:
   a first suspension member that defines a first side of the drive carrier;
   a second suspension member that defines a second side of the drive carrier, the second suspension member configured to be manually flexed resiliently away from the drive carrier during installation of a disk drive;
   a handle having a hinge point coupled to the suspension members, the hinge point defining an axis of rotation for the handle, and the axis of rotation lies substantially perpendicular to a plane defined by the first suspension member;
   a first pin configured to couple to a mounting hole of the disk drive, and the first pin coupled to the first suspension member;
   a second pin configured to couple to a mounting hole of the disk drive, and the second pin coupled to the second suspension member, wherein the first and second pins suspend the disk drive within the drive carrier between the suspension members;
   a front face having an aperture therein, the front face coupled to the suspension members; and
   a baffle in operational relationship to the aperture of the front face, wherein in a first orientation the baffle impedes airflow through the aperture in the front face, and in a second orientation the baffle presents substantially no impedance to airflow through the front face.

10. A system comprising:
an enclosure that defines an internal volume;
a drive bay within the internal volume, the drive bay accessible through an aperture of the enclosure; and
a drive carrier configured to be selectively inserted into and removed from the drive bay by way of the aperture, the drive carrier comprising:
a first rail on a first side of the drive carrier, the first rail defines a first plane;
a second rail on a second side of the drive carrier;
a third rail on the second side of the drive carrier, the first, second and third rails configured to hold a disk drive within the drive carrier;
a structural member coupled between the first rail and the second rails, the structural member defines a bottom plane perpendicular to the first plane;
the second and third rails each configured to be manually flexed resiliently away from the drive carrier during installation of a disk drive, the second and third rails configured such that:
in respective rest orientations the second and third rails define second and third planes, respectively, and the second and third planes parallel to the first plane and perpendicular to the bottom plane; and
in respective flexed orientations the second and third rails perpendicular to the bottom plane;
a handle coupled to the rails, the handle having an axis of rotation that lies substantially parallel to the bottom plane; and
a pin and isolation member the pin comprises a cylinder that defines a first portion and a second portion, the first portion telescopes into a mounting hole of the disk drive, the first portion has a smooth outer surface, and the pin coupled to the first rail by way of the isolation member.

11. The system according to claim 10 further comprising:
a tab that extends from the enclosure proximate to the aperture; and
a catch portion on the handle, when the drive carrier is inserted within the drive bay, the catch portion is in operational relationship to the tab;
wherein as the handle is rotated toward a latched configuration, the catch portion applies an insertion force to the drive carrier.

12. The system according to claim 10 wherein the first and second rails of the drive carrier suspend the disk drive within the drive carrier.

13. The system according to claim 10 wherein the pin further comprises a metallic cylinder having a smooth outer surface, and wherein the pin telescopes within the mounting hole of the disk drive.

14. The system according to claim 10 wherein the isolation member further comprises a rubber grommet.

15. The system according to claim 10 further comprising
the first rail having a width;
the second rail having a width greater than the first rail; and
a channel on a side of the drive bay, the channel having a width configured to accept the first rail, and the width of the channel smaller than the width of the second rail.

16. The system according to claim 10 wherein the drive carrier further comprises an air baffle, the air baffle selectively configurable to impede airflow through the drive carrier in the absence of a disk drive and to lay flat.

17. A system comprising:
an enclosure that defines an internal volume;
a drive bay within the internal volume, the drive bay accessible through an aperture of the enclosure;
a tab that extends from the enclosure proximate to the aperture; and
a drive carrier configured to be selectively inserted into and removed from the drive bay by way of the aperture, the drive carrier comprising:
a first rail on a first side of the drive carrier;
a second rail on a second side of the drive carrier, the first and second rails configured to hold a disk drive within the drive carrier;
a handle coupled to the rails, the handle having an axis of rotation that lies substantially perpendicular to the first rail;
a catch portion on the handle, when the drive carrier is within the drive bay, the catch portion is in operational relationship to the tab; and
a pin and isolation member, the pin configured to couple to a mounting hole of the disk drive, and the pin coupled to the first rail by way of the isolation member;
wherein the disk drive couples to the first and second rails without the use of hand tools; and
as the handle is rotated toward an unlatched configuration, the catch portion applies a removal force to the drive carrier.

18. A drive carrier comprising:
a first suspension member that defines a first side of the drive carrier;
a second suspension member that defines a second side of the drive carrier, the second suspension member configured to be manually flexed resiliently away from the drive carrier during installation of a disk drive;
a shield member mechanically coupled to the first and second suspension members, the shield member comprises a plurality of fingers that extend outward from the driver carrier and are configured to contact a shield member of an immediately adjacent driver carrier, and the shield member and fingers are metallic;
a handle having a hinge point coupled to the suspension members, the hinge point defining an axis of rotation for the handle, and the axis of rotation lies substantially perpendicular to the first suspension member;
a first pin configured to couple to a mounting hole of the disk drive, and the first pin coupled to the first suspension member; and
a second pin configured to couple to a mounting hole of the disk drive, and the second pin coupled to the second suspension member, wherein the first and second pins suspend the disk drive within the drive carrier between the suspension members.

19. The drive carrier according to claim 18 further comprising an isolation member that couples between the pin and the suspension member.

20. The drive carrier according to claim 19 wherein the isolation member is a rubber grommet.

21. The drive carrier according to claim 18 further comprising
the first suspension member having a width;
the second suspension member having a width greater than the first suspension member.

* * * * *

UNITED STATES PATENT AND TRADEMARK OFFICE
CERTIFICATE OF CORRECTION

PATENT NO. : 7,639,492 B2  Page 1 of 1
APPLICATION NO. : 11/741666
DATED : December 29, 2009
INVENTOR(S) : Fred C. Thomas et al.

It is certified that error appears in the above-identified patent and that said Letters Patent is hereby corrected as shown below:

In column 11, line 33, in Claim 10, delete "member" and insert -- member, --, therefor.

Signed and Sealed this

Thirtieth Day of March, 2010

David J. Kappos
*Director of the United States Patent and Trademark Office*